(12) United States Patent
Gussoni et al.

(10) Patent No.: US 8,539,263 B2
(45) Date of Patent: Sep. 17, 2013

(54) METHOD OF CHOOSING A FUNCTIONING MODE OF AN INTEGRATED CIRCUIT DEVICE AND RELATIVE DEVICE

(75) Inventors: Alberto Gussoni, Cornaredo (IT);
Ambrogio Bogani, Limbiate (IT);
Luigino D'Alessio, Zelo Surrigone (IT);
Paolo Pascale, Rho (IT)

(73) Assignee: STMicroelectronics S.R.L., Agrate Brianza (MB) (IT)

( * ) Notice: Subject to any disclaimer, the term of this patent is extended or adjusted under 35 U.S.C. 154(b) by 372 days.

(21) Appl. No.: 12/973,427

(22) Filed: Dec. 20, 2010

(65) Prior Publication Data
US 2011/0148482 A1 Jun. 23, 2011

(30) Foreign Application Priority Data
Dec. 21, 2009 (IT) .............................. VA2009A0093

(51) Int. Cl.
*G06F 1/26* (2006.01)
(52) U.S. Cl.
USPC ........................... 713/300; 713/310; 713/320
(58) Field of Classification Search
USPC ........................................ 713/300, 310, 320
See application file for complete search history.

(56) References Cited

U.S. PATENT DOCUMENTS

| 5,828,892 A | 10/1998 | Mizuta ..................... 395/750.01 |
| 2006/0000917 A1 | 1/2006 | Kim et al. ..................... 235/492 |
| 2007/0210174 A1* | 9/2007 | Deprun et al. ................. 235/492 |
| 2007/0283076 A1 | 12/2007 | Kim et al. ...................... 710/315 |
| 2008/0185444 A1 | 8/2008 | Kim et al. ...................... 235/492 |
| 2008/0245878 A1* | 10/2008 | Shiota et al. ................... 235/492 |
| 2009/0166423 A1* | 7/2009 | Dischamp et al. ............. 235/449 |

FOREIGN PATENT DOCUMENTS

| EP | 0613076 | 1/1994 |
| EP | 1833006 | 9/2007 |
| JP | 07-30070 | 1/1995 |
| JP | 2004078656 A | * 3/2004 |

\* cited by examiner

*Primary Examiner* — Kim Huynh
*Assistant Examiner* — Zahid Choudhury
(74) *Attorney, Agent, or Firm* — Allen, Dyer, Doppelt, Milbrath & Gilchrist, P.A.

(57) ABSTRACT

A method is for choosing a mode out of a set of functioning modes of an integrated circuit (IC) device powered from different supply voltages from respective supply nodes. The IC device may include a mode pin for determining a functioning mode of the device, an internal control circuit coupled to the supply nodes and to the mode pin for sensing an electrical value on the mode pin and to start the IC device in a respective functioning mode depending on the supply node that is powered first. The method may include identifying the different supply voltage that first exceeds a threshold voltage, when the internal control circuit is powered, sensing the electrical value on the mode pin, and powering circuits of the IC device from the different supply voltage that first exceeded the threshold voltage and starting the device in a functioning mode determined by a value of the electrical value sensed on the mode pin and by the different supply voltage that first exceeded the voltage threshold.

12 Claims, 7 Drawing Sheets

METHOD OF CHOOSING A FUNCTIONING MODE OF AN INTEGRATED CIRCUIT DEVICE AND RELATIVE DEVICE

FIELD OF THE INVENTION

This present invention relates to an electronic circuit, and more particularly, to a method of choosing a functioning mode of an integrated circuit device and a related integrated circuit device.

BACKGROUND OF THE INVENTION

In integrated circuit devices adapted to work in one of a plurality of functioning modes, it may be necessary to choose a desired functioning mode at power up of the device. To accomplish this task, integrated circuit devices typically may have one or more mode pins that are sensed at the start-up to read the values therefrom. Depending on the values, the functioning mode of the integrated circuit is chosen. For example, such a pre-established electrical value could be the impedance "seen" on the mode pin: if this impedance is smaller than a certain threshold, it means that a load (for example a smart card) is connected to the pin and the integrated circuit may access to it.

U.S. Patent Application Publication No. 2008/0185444 to Kim et al. discloses an integrated circuit device adapted to function either according to an ISO or to an IEEE functioning mode. A mode detector circuit may be coupled to a plurality of pads to eventually detect a connection to an external load and to choose the functioning mode in which the integrated circuit may work.

In devices that are powered by two supply voltages, such a choice between the two possible functioning modes may be carried out as disclosed in the Japanese Patent Document No. JP 7-30070 without requiring dedicated mode selection pins. According to this approach, the choice of either one or the other operating mode of the integrated circuit is carried out by applying the two supply voltages not simultaneously on the two supply nodes but with a certain time lag. Depending on the succession with which the supply voltages are applied to the two nodes, the integrated circuit device may be started in one or in the other functioning mode. Accordingly, this prior device may always be powered with two external supply voltages, that may both be provided according to a certain time sequence in order to start the device in a desired functioning mode.

SUMMARY OF THE INVENTION

A method for choosing a functioning condition of an integrated circuit and a related device has been found.

The device may include an internal control circuit that may be powered with only one or with more different supply voltages. Once powered, this internal control circuit may either sense the value assumed by an electrical value on one or more mode pins of the integrated circuit and start the device in a functioning mode chosen as a function of the applied supply voltages and on the sensed values of the electrical values, or may wait until another supply voltage is provided.

According to an embodiment, the integrated circuit may comprise a first converter of a first external supply voltage, and a second converter of a second supply voltage, each generating respective internal self-supply voltages first and second of the integrated circuit. The internal control circuit may comprise two distinct blocks, each supplied by the internal self-supply voltage generated by a respective converter. Each block, when powered, may sense the value of at least one electrical value on certain mode pins of the integrated circuit and may start the device in a respective functioning mode.

DETAILED DESCRIPTION OF THE PREFERRED EMBODIMENTS

The integrated circuit for implementing the method of the present invention may be powered by only one or by more supply voltages and has at least a mode pin used for choosing a functioning mode of the integrated circuit. The device includes an internal control circuitry adapted to function in different modes depending on whether it is powered by only one supply voltage (and which one) or by more supply voltages at the same time. The functioning mode in which the integrated circuit may start is determined depending on the status of the mode pin(s) and the provided supply voltage. Therefore, a same number of possible functioning modes of the device may be obtained with a reduced number of mode pin(s) of the integrated circuit.

Figure 1:
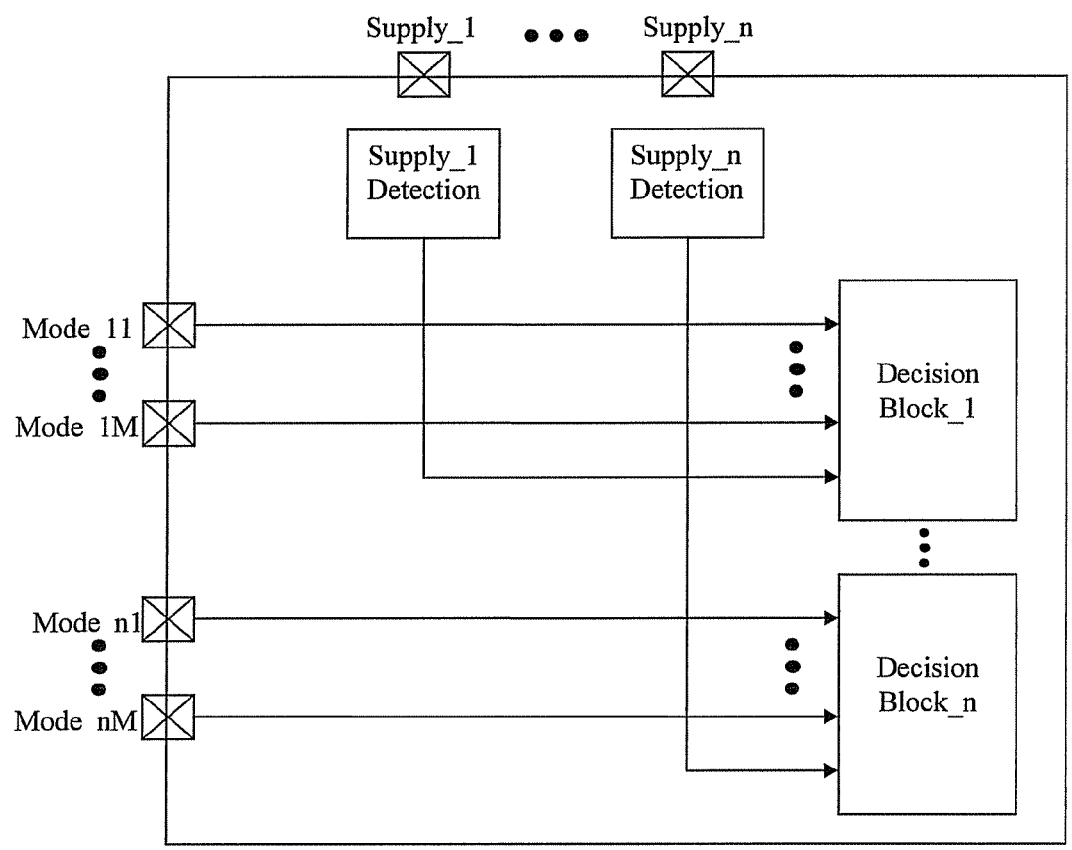
FIGS. 1 and 2 are schematic diagrams of two embodiments of an integrated circuit device, according to the present invention.

FIG. 1 illustrates a first architecture of the integrated circuit. The internal control circuitry may comprise a certain number n of distinct blocks Decision Block1 . . . Decision Blockn, each connected to a respective supply node Supply_1 . . . Supply_n. The blocks Decision Block1 . . . Decision Blockn are adapted to read, when powered, the value of an electrical value of at least one mode pin of the device $MODE\_11 \ldots MODE\_1M \ldots MODE\_n1 \ldots MODE\_nM$. When the internal control circuitry is powered by at least a supply voltage, the supplied block decides either to read the status of certain mode pin(s) and to start the integrated circuit in a functioning condition determined accordingly, or to wait for another supply voltage to be provided to the integrated circuit before reading the status of the mode pin(s).

Therefore, the functioning mode in which the integrated circuit may be started depends also on the supply voltage that is provided to the device, because each supply voltage powers a respective decision block. With this method, it is possible to choose a functioning mode out of a pre-established number of possible functioning modes with a reduced number of mode pins of the device. Moreover, it is not mandatory to always provide all supply voltages to the device, because a single supply voltage may be sufficient to start the device.

Figure 2:
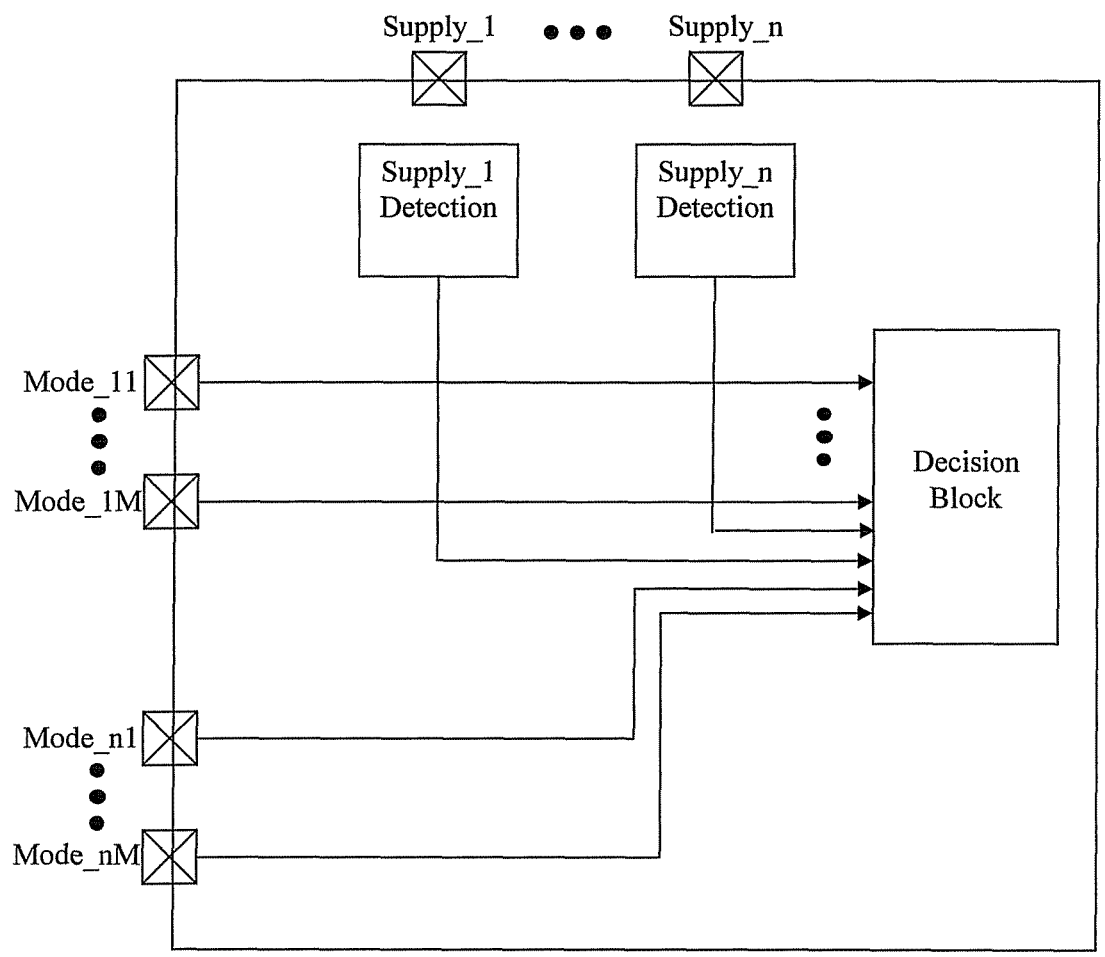

FIG. 2 depicts another embodiment of an integrated circuit in which the internal control circuitry comprises a single decision block that may be powered by any supply voltage. When the decision block is powered, it identifies which supply voltage has been provided and it may decide either to read some or all the mode pin(s) and to start the device in a functioning condition determined accordingly, or to wait until another supply voltage is provided.

Figure 3A:
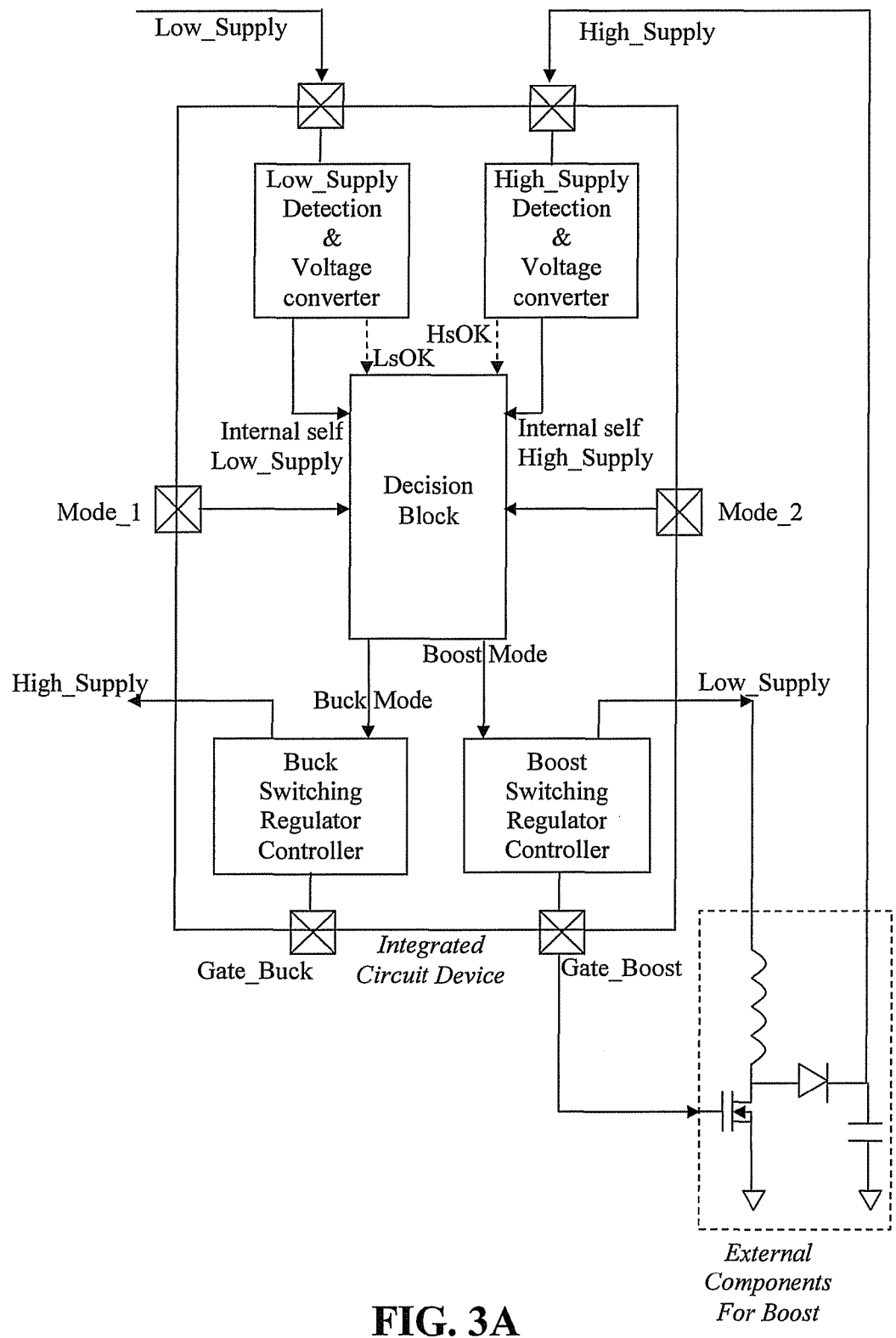
FIGS. 3a to 3c are schematic diagrams of other embodiments of the integrated circuit device according to FIG. 2.
Figure 3B:
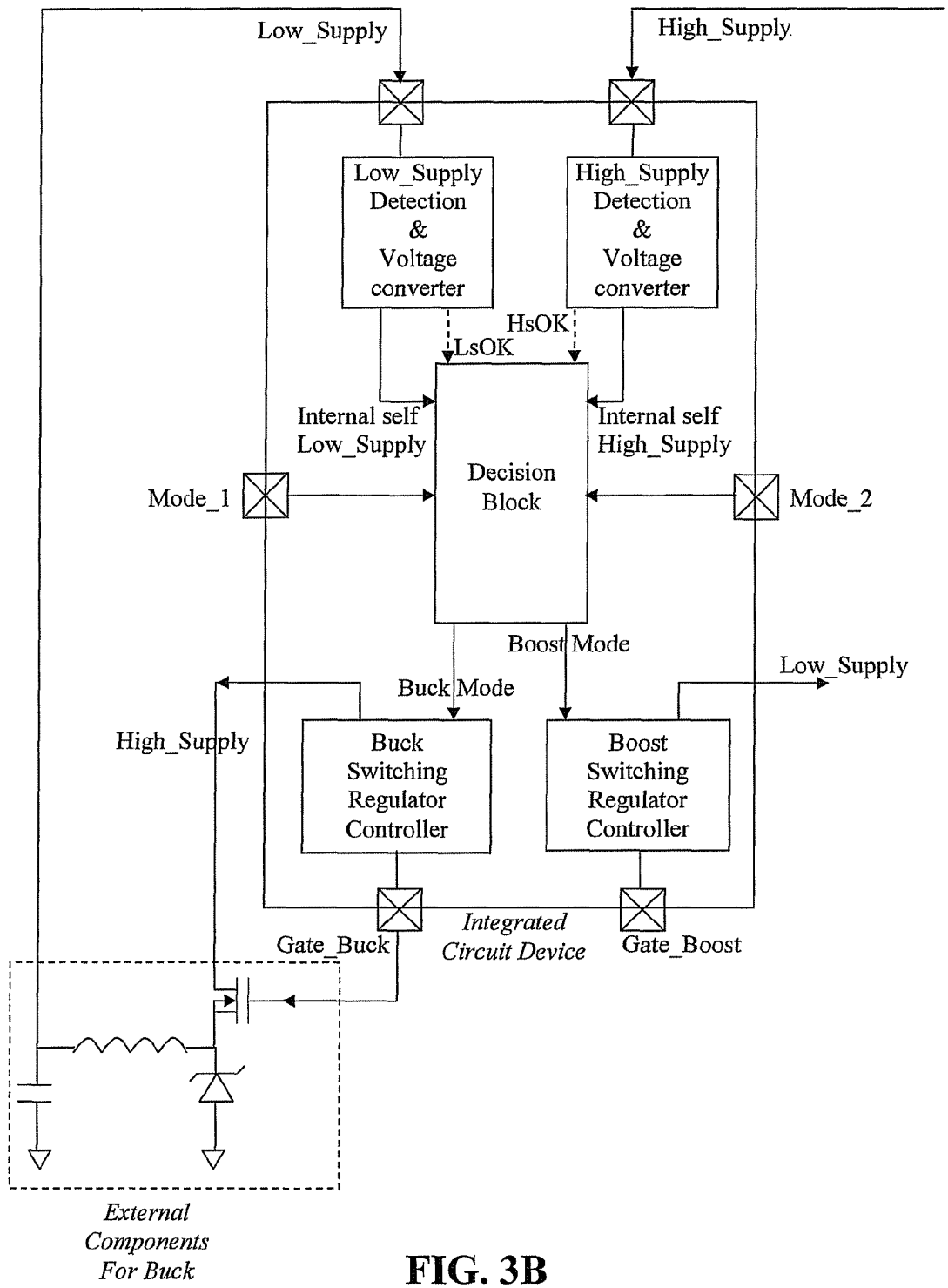
Figure 3C:
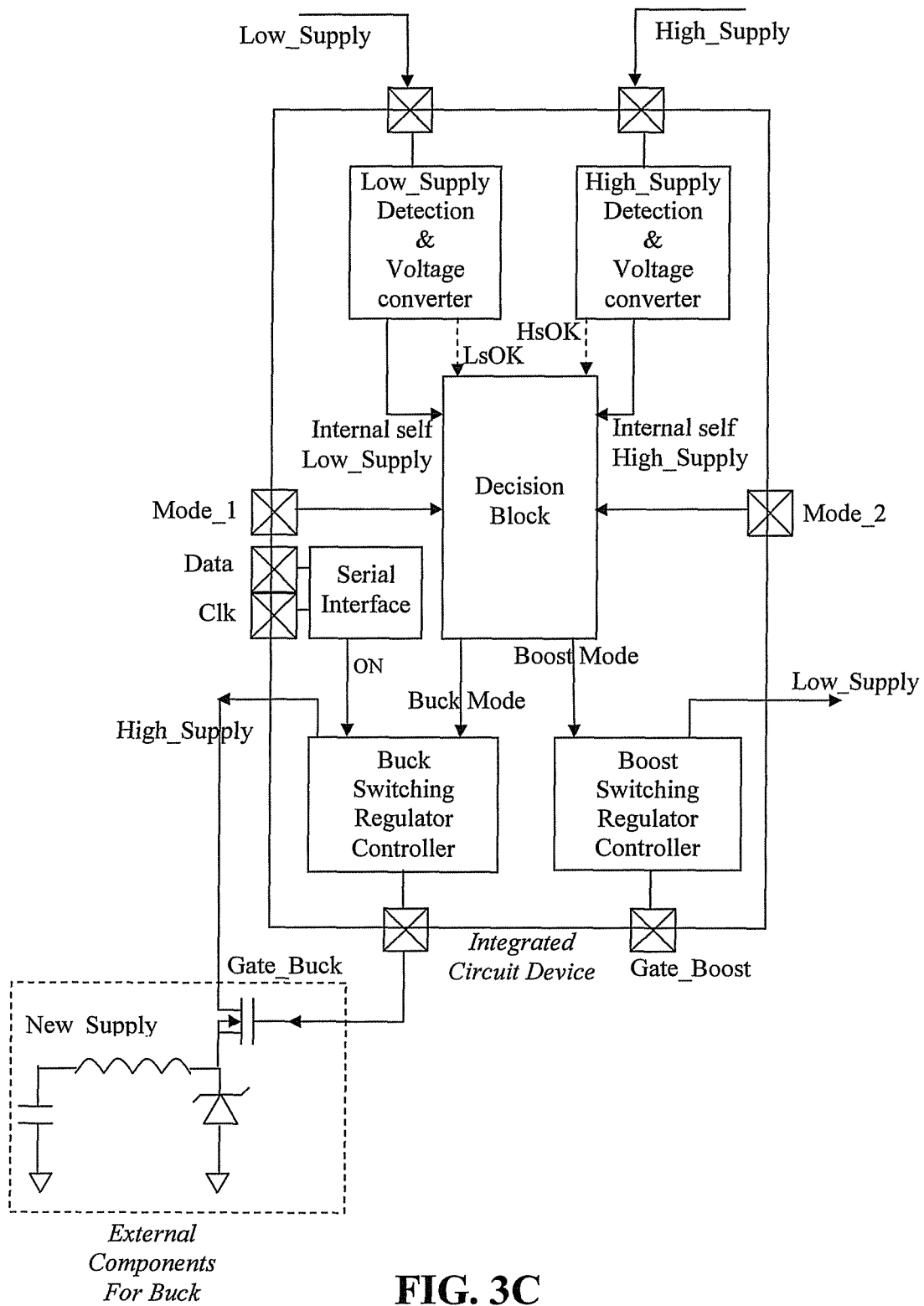

FIGS. 3a to 3c depict architectures of integrated circuits according to the general scheme of FIG. 2. In the integrated circuit device, the following blocks are present:

LOW_SUPPLY DETECTION & VOLTAGE CONVERTER: this block generates a regulated replica supply voltage INTERNAL SELF LOW_SUPPLY of the externally provided supply voltage LOW_SUPPLY. The voltage INTERNAL SELF LOW_SUPPLY is provided to the Decision Block both to supply this circuit and to give the information that the external LOW_SUPPLY has been detected. As an option, the information that the external LOW_SUPPLY has been detected may be provided by a generated flag LsOK.

HIGH SUPPLY DETECTION & VOLTAGE CONVERTER: this block is substantially similar to the LOW_SUPPLY DETECTION & VOLTAGE CONVERTER and generates a regulated replica supply voltage INTERNAL SELF HIGH_SUPPLY of the externally provided supply voltage HIGH_SUPPLY. As an alternative, the information that the external HIGH_SUPPLY has been detected may be provided by a purposely generated flag HsOK.

DECISION BLOCK: this block is supplied by both the Internal self LOW_SUPPLY and INTERNAL SELF HIGH_SUPPLY. Depending on which external supply (LOW_SUPPLY and HIGH_SUPPLY) is first made available, this circuit is able to monitor the status of the mode pins MODE_1 or MODE_2. The voltage present on the mode pins is converted through a comparator in a logic state, that may be stored in a memory element. Depending on this logic state, the Decision Block asserts the internal signal BUCK MODE or BOOST MODE, or may even not assert any of them.

BUCK SWITCHING REGULATOR CONTROLLER: this block is the driver of an external switch and, together with other external components, it implements a buck switching regulator.

BOOST SWITCHING REGULATOR CONTROLLER: this block is the driver of an external switch and, together with other external components, it implements a boost switching regulator.

Three configurations may be set: FIG. 3a) If the external voltage LOW_SUPPLY is supplied first to the device, the circuit DECISION BLOCK is powered with the INTERNAL SELF LOW SUPPLY generated by the respective voltage converter and it senses an electrical value on the mode pin MODE_1. When a certain condition is met by the sensed electrical value on the mode pin, for example, when the voltage available thereon exceeds a threshold, then the integrated circuit enters in a functioning boost mode in which an internal circuit BOOST SWITCHING REGULATOR CONTROLLER, supplied by the external voltage LOW_SUPPLY, is enabled to make an external voltage generator using external components to generate a second supply voltage HIGH_SUPPLY, on its turn distributed to other functional circuit blocks of the integrated circuit.

FIG. 3b) If the external voltage HIGH_SUPPLY is supplied first to the device, the circuit DECISION BLOCK is powered by the internal self High supply generated by the voltage converter and it senses an electrical value on the mode pin MODE_2. When a certain condition is met by the sensed electrical value on the mode pin, then the integrated circuit enters in a functioning buck mode in which an internal circuit BUCK SWITCHING REGULATOR CONTROLLER, supplied by the external voltage HIGH_SUPPLY, is enabled to control an external voltage generator, using external components, such to generate a second supply voltage LOW_SUPPLY, on its turn distributed to other functional circuit blocks of the integrated circuit.

FIG. 3c) Independently on which external supply has been provided first, if a certain condition is not met by the sensed electrical value on the mode pin, the device may not enter in buck mode or in boost mode. In this embodiment, it may be necessary to supply the device by both LOW_SUPPLY and HIGH_SUPPLY voltages. A serial interface, a data pin DATA and a clock pin CLK are also shown. When both external supply voltages are provided to the integrated circuit, the serial interface senses whether or not data is made available on the dedicated pin DATA synchronous with clock pulses on the pin CLK. In this case, it generates an enabling signal ON for enabling the buck controller (and/or the boost controller, according to another embodiment not illustrated in the drawings) and allowing generation of a supply voltage to be distributed to external circuits.

Figure 4A:
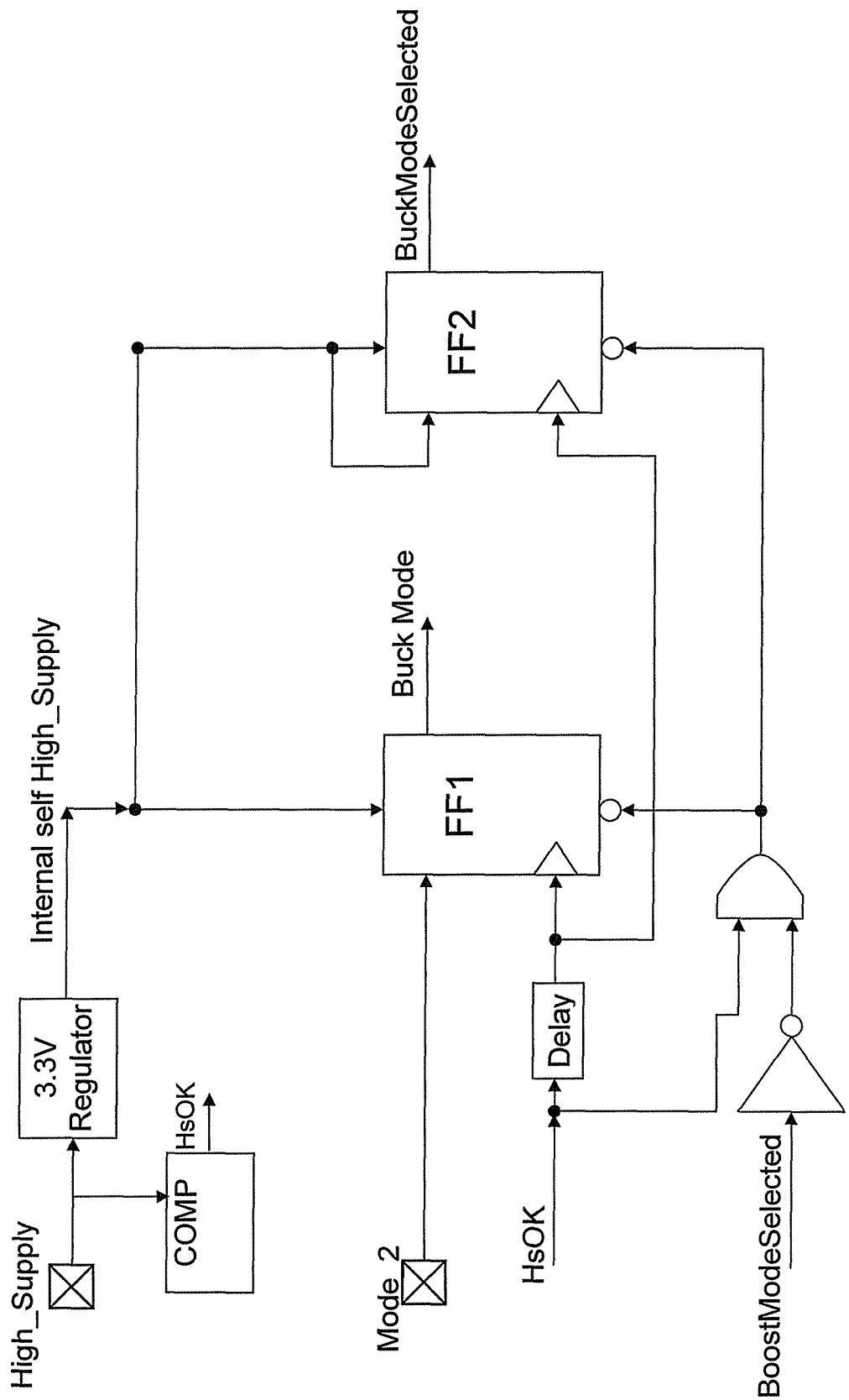
FIGS. 4a and 4b are schematic diagrams of embodiments of the supply detection and the voltage converter, and the decision block of FIGS. 3a to 3c, respectively.

According to yet another embodiment, the device of FIGS. 3a to 3c may be realized such as to enable either the BUCK or the BOOST SWITCHING REGULATOR CONTROLLER and at the same time keep disabled the other one, depending on which supply voltage is provided first. As illustrated in FIGS. 4a, when the high supply voltage is provided, a regulator 3.3V REGULATOR generates the voltage INTERNAL SELF HIGH SUPPLY (that, in the shown exemplary embodiment, is a 3.3V supply voltage, which is a standard for digital circuits) for powering the decision block, and a comparator COMP generates a logically active flag HsOK when the voltage HIGH_SUPPLY surpasses a threshold, flagging that the voltage HIGH_SUPPLY is available.

Figure 4B:
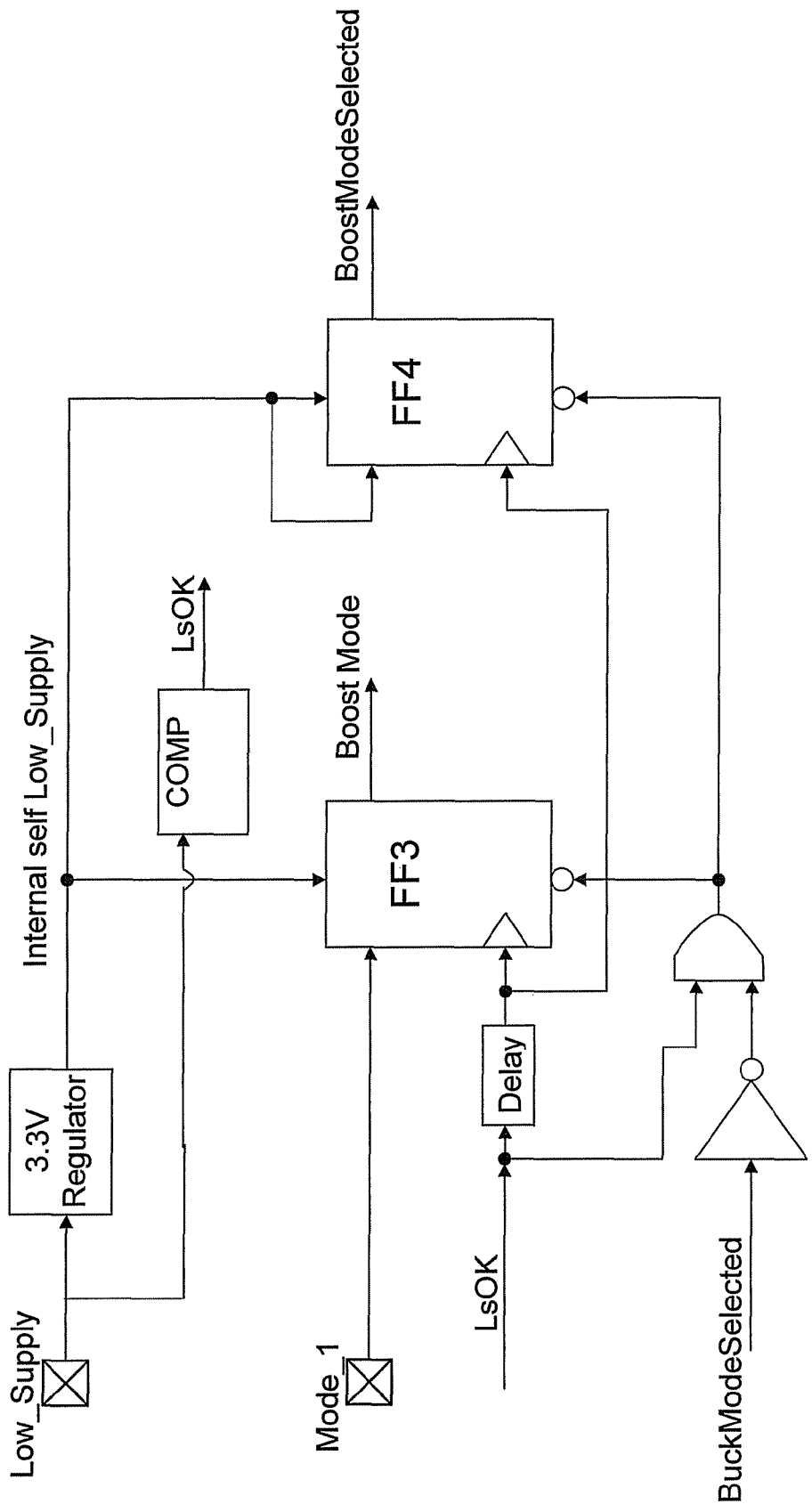

If the LOW_SUPPLY has been already provided and the boost converter has already been enabled or disabled depending on the voltage sensed on MODE_1 pin, the dual circuit of FIG. 4b through the signal BOOST MODE SELECTED blocks the flip-flops FF1 and FF2, included in the DECISION BLOCK in FIG. 4a. Otherwise, the flip-flop FF2 generates a flag BUCK MODE SELECTED for keeping disabled the BOOST SWITCHING REGULATOR CONTROLLER.

A delay block DELAY introduces a time-delay longer than the time delay introduced by the AND gate, for allowing active edges of the flag HsOK to reach the flip-flop FF1 and FF2 after both of them have been enabled. The mode pin MODE_2 is read, and the flip-flop FF1 generates the signal BUCK MODE, that enables the BUCK SWITCHING REGULATOR CONTROLLER, when an appropriate voltage is applied on the pin MODE_2.

The functioning of the circuit of FIG. 4b is substantially identical to that of FIG. 4a and can be immediately understood from the indications given above. The two circuits of FIGS. 4a and 4b cooperate to enable either the BUCK or BOOST SWITCHING REGULATOR CONTROLLER depending on which supply voltage LOW_SUPPLY or HIGH_SUPPLY is provided first to the integrated circuit and when a certain voltage is applied on the respective mode pin MODE_1 or MODE_2.

That which is claimed is:

1. A method of choosing a functioning mode out of a set of functioning modes of an integrated circuit (IC) device powered by a plurality of different supply voltages from respective supply nodes, the IC device including at least one mode pin for determining a functioning mode of the device, at least one internal control circuit coupled to the supply nodes and to the at least one mode pin for sensing at least one electrical value thereon and to start the IC device in a respective functioning mode depending on the supply node that is powered first, the method comprising:

identifying the different supply voltage that first exceeds a threshold voltage, the identified supply voltage being from among the plurality of different supply voltages from the respective supply nodes of the IC device;

when the at least one internal control circuit is powered, sensing the at least one electrical value on the at least one mode pin; and powering circuits of the IC device from the different supply voltage that first exceeded the threshold voltage and starting the device in a functioning mode determined by the at least one electrical value and the different supply voltage that first exceeded the voltage threshold.

2. The method of claim 1 wherein the IC device operates using only the different supply voltage that first exceeded the voltage threshold.

3. The method of claim 2 wherein the IC device comprises a plurality of decision blocks coupled to respective ones of the plurality of different supply voltages.

4. The method of claim 3 wherein the different supply voltage that corresponds with the different supply voltage that first exceeded the voltage threshold decides whether to operate the IC device using only the different supply voltage that first exceeded the voltage threshold.

5. An integrated circuit (IC) device comprising:
   a plurality of supply nodes configured to respectively receive a plurality of different supply voltages;
   at least one mode pin configured to determine a functioning mode; and
   at least one internal control circuit coupled to said plurality of supply nodes and to said at least one mode pin and configured to
      identify the different supply voltage that first exceeds a voltage threshold from among the plurality of different supply voltages from said plurality of supply nodes,
      sense at least one electrical value on said at least one mode pin, and
      start in a determined functioning mode based upon which different supply voltage first exceeds the voltage threshold and based upon the at least one electrical value on said at least one mode pin.

6. The IC device of claim 5 further comprising:
   a first voltage converter configured to be powered by a first supply voltage from the plurality of different supply voltages for generating a first internal supply voltage; and
   a second voltage converter configured to be powered by a second supply voltage from the plurality of different supply voltages for generating a second internal supply voltage;
   said at least one internal control circuit configured to enter in the determined functioning mode based upon whether the first internal supply voltage or the second internal supply voltage has been generated first.

7. The IC device of claim 6 wherein said at least one internal control circuit comprises a first decision block powered by the first internal supply voltage, and a second decision block powered by the second internal supply voltage.

8. The IC device of claim 7 wherein said at least one mode pin comprises a plurality thereof; and wherein each decision block comprises:
   a comparator configured to compare the respective internal supply voltage with a respective threshold and to generate a flag signal when the respective threshold is exceeded;
   a first flip-flop configured to
      be supplied with the respective internal supply voltage,
      input with an electrical value on a respective mode pin, and
      generate, when enabled, an active command in correspondence with active edges of the flag signal for enabling the respective voltage converter configured to generate the respective internal supply voltage; and
   a second flip-flop configured to be supplied with the respective internal supply voltage and to generate, when enabled, a disabling command of the other decision block in correspondence of active edges of the flag signal.

9. The IC device of claim 5 wherein the IC device operates using only the different supply voltage that first exceeded the voltage threshold.

10. The IC device of claim 5 wherein the IC device comprises a plurality of decision blocks coupled to respective ones of the plurality of different supply voltages.

11. The IC device of claim 5 wherein the different supply voltage that corresponds with the different supply voltage that first exceeded the voltage threshold decides whether to operate the determined functioning mode using only the different supply voltage that first exceeded the voltage threshold.

12. An integrated circuit (IC) device configured to be powered from a plurality of different supply voltages from respective supply nodes, the device comprising:
   a plurality of mode pins configured to determine a functioning mode;
   at least one internal control circuit coupled to the supply nodes and to said plurality of mode pins and configured to
      identify the different supply voltage that first exceeds a voltage threshold,
      sense at least one electrical value on said plurality of mode pins, and
      start in a determined functioning mode based upon which different supply voltage first exceeds the voltage threshold and based upon the at least one electrical value on said plurality of mode pins;
   a first voltage converter configured to be powered by a first supply voltage from the plurality of different supply voltages for generating a first internal supply voltage; and
   a second voltage converter configured to be powered by a second supply voltage from the plurality of different supply voltages for generating a second internal supply voltage;
   said at least one internal control circuit configured to enter in the determined functioning mode based upon whether the first internal supply voltage or the second internal supply voltage has been generated first;
   said at least one internal control circuit comprising a first decision block powered by the first internal supply voltage, and a second decision block powered by the second internal supply voltage;
   each decision block comprises
      a comparator configured to compare the respective internal supply voltage with a respective threshold and to generate a flag signal when the respective threshold is exceeded,
      a first flip-flop configured to
      be supplied with the respective internal supply voltage,
      input with an electrical value on a respective mode pin, and
      generate, when enabled, an active command in correspondence with active edges of the flag signal for enabling the respective voltage converter configured to generate the respective internal supply voltage, and
      a second flip-flop configured to be supplied with the respective internal supply voltage and to generate, when enabled, a disabling command of the other decision block in correspondence of active edges of the flag signal.

* * * * *